United States Patent
Stansfield et al.

(10) Patent No.: US 6,523,107 B1
(45) Date of Patent: Feb. 18, 2003

(54) METHOD AND APPARATUS FOR PROVIDING INSTRUCTION STREAMS TO A PROCESSING DEVICE

(75) Inventors: Anthony Stansfield, Bristol (GB); Alan David Marshall, Bristol (GB); Jean Vuillemin, Paris (FR)

(73) Assignee: Elixent Limited, Bristol (GB)

( * ) Notice: Subject to any disclaimer, the term of this patent is extended or adjusted under 35 U.S.C. 154(b) by 0 days.

(21) Appl. No.: 09/209,532

(22) Filed: Dec. 11, 1998

(30) Foreign Application Priority Data

Dec. 17, 1997 (EP) .............................. 97310220
Jun. 9, 1998 (EP) .............................. 98304528

(51) Int. Cl.$^7$ .............................................. G06F 9/38
(52) U.S. Cl. ...................................... 712/206; 712/215
(58) Field of Search .................. 712/206, 23, 215–217, 712/21–22

(56) References Cited

U.S. PATENT DOCUMENTS

| | | | |
|---|---|---|---|
| 4,236,204 A | 11/1980 | Groves ........................ 364/200 |
| 4,698,751 A | 10/1987 | Parvin ........................ 364/200 |
| 4,714,994 A | * 12/1987 | Oklobdzija et al. ......... 712/207 |
| 4,766,566 A | * 8/1988 | Chuang ........................ 712/23 |
| 4,775,952 A | 10/1988 | Danielsson et al. ......... 364/736 |
| 4,847,759 A | * 7/1989 | Oklobdzija .................. 364/200 |
| 5,204,556 A | 4/1993 | Shankar .................... 307/465.1 |
| 5,208,491 A | 5/1993 | Ebeling et al. ............. 307/465 |
| 5,233,539 A | 8/1993 | Agrawal et al. ............ 364/489 |
| 5,291,431 A | 3/1994 | Ho et al. |
| 5,426,379 A | 6/1995 | Trimberger |
| 5,457,644 A | 10/1995 | McCollum .................. 364/716 |
| 5,493,239 A | 2/1996 | Zlotnick ...................... 326/38 |
| 5,498,975 A | 3/1996 | Cliff et al. .................... 326/10 |
| 5,568,646 A | 10/1996 | Jaggar ........................ 312/800 |
| 5,583,450 A | 12/1996 | Trimberger et al. ......... 326/41 |
| 5,586,277 A | * 12/1996 | Brown et al. ............... 712/210 |
| 5,621,694 A | * 4/1997 | Sakugawa et al. ..... 365/230.02 |
| 5,680,597 A | * 10/1997 | Kumar et al. ............... 712/226 |
| 5,835,746 A | * 11/1998 | Girardeau, Jr. et al. ..... 712/215 |
| 5,923,612 A | * 7/1999 | Park et al. .................. 365/233 |
| 6,188,240 B1 | 2/2001 | Nakaya ........................ 326/39 |

FOREIGN PATENT DOCUMENTS

| | | |
|---|---|---|
| EP | 0 726 532 A | 8/1996 |
| WO | 95/22205 | 8/1995 |
| WO | WO 97/46948 | 12/1997 |

OTHER PUBLICATIONS

"The Thumb Architecture," Advanced RISC Machines Limited Specification, pp. 1–2, (1995).

Patterson, D.A., et al., *Computer Architecture: A Quantitative Approach*, San Mateo, California: Morgan Kaufmann Publishers, Inc., Chapter 4.5: pp. 160–166, Appendix E: pp. E–1–E24, (1995).

Chen, D.C., et al., "A Reconfigurable Multiprocessor IC for Rapid Prototyping of Real–Time Data Paths," IEEE International Solid–State Circuits Conference, pp. 74–75, (Feb. 1992).

(List continued on next page.)

*Primary Examiner*—Richard L. Ellis
*Assistant Examiner*—Gautam R. Patel
(74) *Attorney, Agent, or Firm*—Orrick, Herrington & Sutcliffe, LLP

(57) ABSTRACT

A circuit is provided to provide instruction streams to a processing device: embodiments of the circuit are appropriate for use with RISC CPUs, whereas other embodiments are useable with other processing devices, such as small processing devices used in a field programmable array. The circuit receives an external instruction stream which provides a first set of instruction values, and has a memory which contains a second set of instruction values. Two or more outputs provide instruction streams to the processing device. The circuit has a control input in the form of a mask which causes a selection means to allocate bits from the first and second sets of instruction values to different instruction streams to the processing device.

23 Claims, 4 Drawing Sheets-

OTHER PUBLICATIONS

Yeung, A.K., et al., "A Data–Driven Multiprocessor Architecture (PADDI2) for Irregular Computation–Intensive DSP Algorithms," IEEE VLSI Signal Processing Workshop, pp. 1–5 (Oct. 1992).

Mirsky, E., et al., "Matrix: A Reconfigurable Computing Architecture with Configurable Instruction Distribution and Deployable Resources," FCCM '96: IEEE Symposium on FPGAs for Custom Computing Machines, Apr. 17–19, 1996, Napa, California, USA pp. 1–10.

DeHon, A., "Reconfigurable Architectures for General–Purpose Computing," Technical Report 1586, MIT Artificial Intelligence Laboratory, pp. 257–296.

Koren, I., "High–Speed Multiplication," *Computer Arithmetic Algorithms*, Englewood Cliffs, New Jersey: Prentice Hall, pp. 99–103, (1993).

Hartle, R.I., et al., "The serial–serial bit . . . ," *Digit–Serial Computation*, Norwell USA: Kluwer Academic Publishing, pp. 1–2, (1995).

D. Bursky "Gate Arrays Face Onslaught of Dense and Flexible FPGA's", *Electronic Design*, vol. 43, No. 13, Jun. 26, 1995, pp. 85–86, 88, 90, 94, and 96.

D. Bursky, "SRAM Blocks and Antifuse Logic Combine In New FPGA's", *Electronic Design*, vol. 43, No. 16, Aug. 7, 1995, pp. 115, 116, and 118.

G. Borriello, et al. "The Triptych FPGA Architecture", *IEEE Transactions On Very Large Scale Integration (VLSI) Systems*, vol. 3, No. 4, Dec., 1995, pp. 491–500.

Paneerselvam, G., et al., "Design and Implementation of an Area and Time Efficient Systolic Parallel Booth Multiplier", Proceedings of the Midwest Symposium on Circuits and Systems, Detroit, Aug. 16–18, 1993, vol. 2, No. Symp. 36, Aug. 16, 1993, pp. 1497–1500, *Institute Of Electrical And Electronics EngineerS*, see paragraph 3.

Balsara, P.T., et al., "Understanding VLSI Bit Serial Multipliers", *IEEE Transactions On Education*, vol. 39, No. 1, Feb. 1, 1996, pp. 19–28, see paragraph II–V.

Dadda, L., "On Serial–Input Multipliers for Two's Compliment Numbers", *IEEE Transactions On Computers*, vol. 38, No. 9, Sep. 1989, pp. 1341–1345, see paragraph III.

Satyanarayana, et al., "A Comprehensive Approach to the Design of Digit–Serial Modified Booth Multipliers", *Proc. 26Th Southeastern Symp. On System Theory*, 1994, pp. 229–233, see paragraph 3.

Wo, et al., "Exploiting Neural Network Parallelism", *1st Int. Workshop in Parallel Processing*, 1994, pp. 586–592, see paragraph 3.

Patent Abstracts of Japan, vol. 006, No. 104 (P–122), Jun. 1982 (Abstract of Japanese Patent Document No. JP 57 036347 A (NEC Corp.), Feb. 1982).

Patent Abstracts of Japan, vol. 007, No. 073 (P–186), Mar. 1983 (Abstracts of Japanese Patent Document No. JP 58 003040 A (NEC Corp.), Jan. 1983).

* cited by examiner

METHOD AND APPARATUS FOR PROVIDING INSTRUCTION STREAMS TO A PROCESSING DEVICE

FIELD OF THE INVENTION

The present invention relates to the provision of instruction streams to a processing device. In preferred embodiments, the invention relates to a method of expanding the instruction stream available to a processing device and thereby enabling a reduction in instruction size.

DESCRIPTION OF THE BACKGROUND ART

In general, programmable devices have their operation controlled by a stream of instructions. Such streams are generally termed instruction streams. Such programmable devices include, but are not limited to, microprocessors. Each instruction within a stream will typically be a pattern of bits of a predetermined length: termed an instruction word. Each pattern of bits is an encoding which represents a particular instruction to the programmable device. For most programmable devices, operations are controlled on a cycle-by-cycle basis: while this is normally true, there are some programmable devices which cannot be meaningfully described as controlled on a cycle-by-cycle basis, such as some types of field programmable gate array (FPGA). Field programmable devices are of particular interest for certain embodiments of the invention, though the examples described will show cycle-by-cycle control.

The encoding of instructions is a compromise between several factors. Firstly, it is desirable for a large number of different operations to be encodable, so that a rich functionality is available to the programmer of the device. Secondly, it is desirable for decoding of instructions to be easy: that is, for relatively little circuitry to be required to convert the external instruction into the required internal control signals. Both these factors lead towards a large number of bits in each instruction word. However, the third factor is that it is generally desirable to have a small number of bits in each instruction word: otherwise large quantities of time and circuit space will be consumed to accommodate the broad data channel required.

One area where these tensions in satisfactory instruction handling are particularly apparent is in RISC (Reduced Instruction Set Computer) processing design. RISC involves limited instruction sets handling a simplified set of instructions, as opposed to the instructions of CISC (Complex Instruction Set Computer) design prevailing up until the mid 1980s: in CISC design, it has generally been considered desirable to specify an instruction for each useful eventuality. General microprocessor design has moved towards RISC design in order to increase speed (as the processing units can be simple, as they are dealing with limited instructions) and to reduce cost (as RISC designs generally require fewer transistors than equivalent CISC designs). However, as RISC lacks the richness of instruction choice present in CISC, code written for RISC processors tends to be considerably longer than code written for CISC processors. In this respect, RISC processors have a disadvantage over CISC processors.

This disadvantage can be more than obviated by providing a rich instruction set with small instruction size. Reducing instruction size is advantageous, as it reduces the overall memory-to-processor bandwidth for the instruction path, and may also reduce the amount of memory to store the program (which may be significant in embedded applications in particular). One approach to reduction of instruction size is "Thumb" architecture of Advanced RISC Machines Limited (ARM), described for example in the World Wide Web site http:/www.dev-com.com/~riscm/Pro+Peripherals/archExt/Thumb/Flyer/ and in U.S. Pat. No. 5,568,646. The ARM processor is a 32-bit processor, with a 32-bit instruction set. The Thumb instruction set comprises a selection of the most used instructions in this 32-bit instruction set, which is then compressed into a 16 bit form. These 16 bit instructions are then decompressed at the processor into 32-bit code. This solution does allow the use of a 16-bit instruction path for a 32-bit processor, but requires additional complexity in the instruction pipeline and relies on reducing the instruction set to a selected group of instructions.

It is therefore desirable to find an alternative approach to optimising the provision of instructions to processing devices, so that rich functionality and ease of decoding can be achieved at a reduced instruction size.

SUMMARY OF THE INVENTION

Accordingly, the invention provides a circuit for providing an instruction stream to a processing device, comprising: an input to receive an external instruction stream for provision of a first set of instruction values; a memory adapted to contain a second set of instruction values; two or more outputs for provision of output instruction streams to the processing device, a control input; and a selection means adapted to distribute the first set of instruction values and the second set of instruction values between the two or more outputs according to the control input.

In this context the term "processing device" is used for essentially any processing element with a capability to accept instructions and perform an information processing function: this clearly includes elements such as CPUs, but also includes processing elements contained within a field programmable array. An example of the application of the invention to such a structure is provided below.

The use of a second set of instructions allows the functionality of the instruction set available at the word length provided in the external instruction stream to be enhanced. Advantageously, it can allow "expansion" of the instruction word, such that the output instruction streams together contain more bits than the external instruction stream. Alternatively, it can allow bits to be diverted from the instruction stream to drive peripheral circuitry for the processing device, which may in itself provide an effective expansion to the instruction set. This peripheral circuitry can be used for a range of functions: an example is to enable or disable data inputs to the processing device.

In a preferred arrangement, the selection means provides for a bitwise selection of valuers between the first set of instruction values and the second set of instruction values, wherein for each selection of a value one bit from either the first set of instruction values and the second set of instruction valued is directed to one of the two or more output, and a corresponding bit from the other of the first set of instruction values and the second set of instruction values is directed to another of the two or more outputs. In this arrangement, the second set of instruction values may be provided as a variable, but in advantageous embodiments it will be provided as one or more constants (for example, a value defined before the start of the external instruction stream, perhaps at device configuration in the case of a configurable or reconfigurable device).

A further useful feature which can improve utilisation within a larger circuit is the use of means to disable either the provision of instructions from the external instruction stream or from the second set of instruction values: these features can reduce program difficulties by allowing one or other device function to be "ignored".

While this approach is effective for use with a processor device which has a datapath width which is the same for both instructions and data, and for which register use is specified independently from instruction function (as is generally the case with RISC processors), it also has clear advantages in other forms of processor design where similar problems exist. The application of the present invention will be discussed not only with respect to RISC design, but also with regard to the design of field programmable devices containing a plurality of processor elements.

A particularly relevant form of field programmable device for application of the invention is one in which the plurality of processing devices are connected to one another by a configurable wiring network, and in which the processing devices are (or comprise) ALUs, especially relatively small ALUs (such as 4-bit ALUs).

BRIEF DESCRIPTION OF THE DRAWINGS

Specific embodiments of the present invention are described below, by way of example, with reference to the accompanying drawings, in which.

DETAILED DESCRIPTION OF THE PREFERRED EMBODIMENTS

Figure 1:
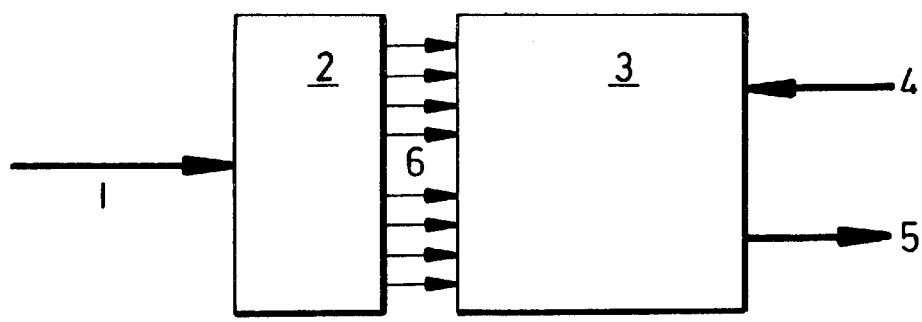
FIG. 1 shows a flow of instructions and data for a traditional programmable system.

First of all, the main elements of a programmable system employing the present invention will be contrasted with a traditional prior art programmable system. The elements of such a traditional prior art programmable system are shown in FIG. 1. Instructions are provided from a memory (not shown) external to the device under control by means of an instruction stream 1, and the set of instruction values represented by the separate elements of an instruction in the instruction stream (for example, the bits of an instruction word) are decoded by an instruction decoder 2 and provided through an output as a decoded instruction 6 meaningful to the device 3 under control. The device 3 under control may be, for example, a RISC processor. The decoded instruction 6 is thus provided to the device 3 under control, which also receives incoming data 4 and provides data output 5 from the decoded instructions 6 and the incoming data 4 that it consumes.

Figure 2:
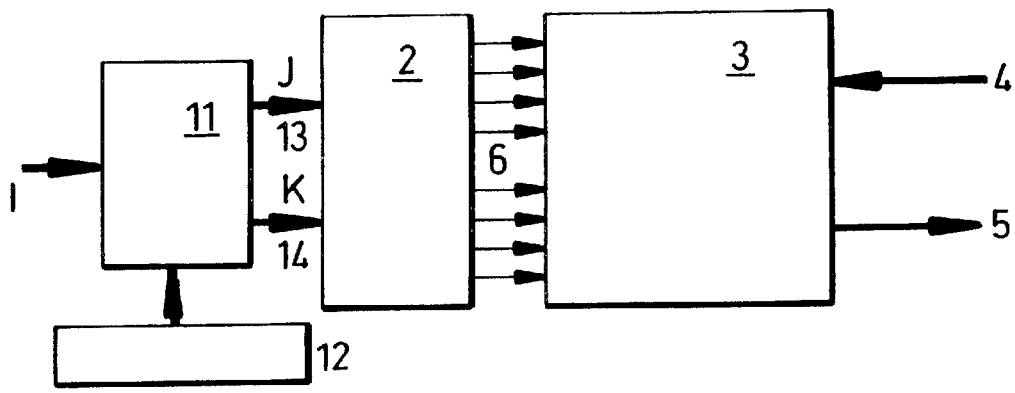
FIG. 2 shows a flow of instructions and data for a programmable system in which an embodiment of the present invention is employed.

FIG. 2 shows the elements of a programmable system employing an embodiment of the invention. Most aspects of this system are the same as for FIG. 1 (this is reflected in the reference numbers used in the Figures), however, the provision of instructions to the instruction decoder 2 is different. Instructions are still provided in an instruction stream 1, but there is an additional source of instructions provided through a selection means 11, here termed an instruction expansion element as it allows for effective expansion of the instruction size. A control input to the instruction expansion element 11 is provided by means of instruction mask 12, as will be discussed further below. The instruction expansion element 11 has two outputs, J and K, which provide two instruction streams 13, 14 to the instruction decoder 2. Other embodiments employing more than two outputs for the instruction expansion element 11, and hence more than two instruction streams, can readily be provided by application of further embodiments of the invention.

Figure 3:
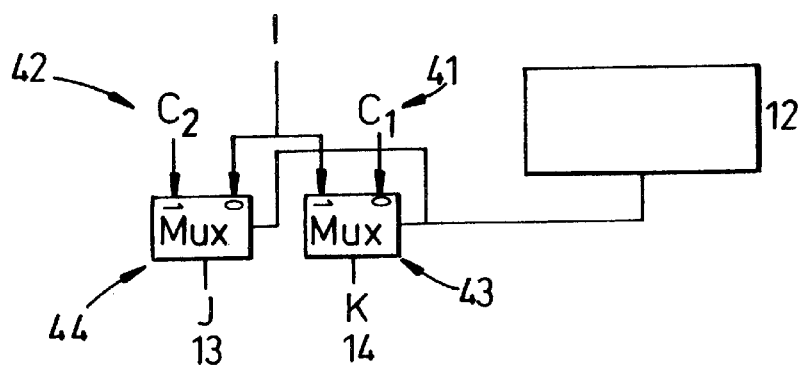
FIG. 3 shows a selection circuit for use in embodiments of the invention.

The instruction mask 12 determines how the first and second sets of instruction values are distributed between the J and K outputs. A basic circuit to perform this function (which also indicates a possible provenance for the second set of instruction values) is shown in FIG. 3. The circuit of FIG. 3 is that necessary for handling 1 bit of the instruction input 1. Fundamental to the basic circuit is a pair of multiplexers 43, 44. The control input for each multiplexer 43, 44 is provided by the value of the instruction mask 12 appropriate to the relevant bit of the instruction input 1. The external input is provided at the "1" input of the first multiplexer 43, and at the "0" input of the second multiplexer 44. The output of the first multiplexer 43 is the K output of the instruction expansion element 11, whereas the output of the second multiplexer 44 is the J output of the instruction expansion element 11. Consequently, in this embodiment every bit of the external instruction input is routed to either the J or the K output of the instruction expansion element 11.

Whichever of the J and K outputs is not fed by the relevant bit from the external instruction stream 1 will be fed by the other input to the respective multiplexer: if the instruction mask value is 1, the J output will be fed by the "1" input to second multiplexer 44, and if the instruction mask value is 0, the K output will be fed by the "0" input to first multiplexer 43. Both these additional multiplexer inputs 41, 42 are provided here by constant values (though in more complex embodiments these could be varied or made data dependent): the "0" input 41 to the first multiplexer is provided by first constant $C_1$, whereas the "1" input 42 to the second multiplexer is provided by second constant $C_2$.

In the arrangement shown in FIG. 3, where a n-bit external input 1 and a n-bit instruction mask 12 are provided, the result wil be a 2n-bit instruction value, of which n bits are provided through the K output and n bits are provided through the J output. The instruction mask 12 effectively serves to steer bits in the external instruction stream to either J or K on a bit-by-bit basis.

Clearly, the increase in number of available bits is not free. For a given mask value, only a subset of the possible values on the J and K outputs can be provided simply by changing the external value. However, it is found that in a large number of practical cases the instruction encoding can be arranged accordingly without difficulty. Specific examples are provided below.

Figure 4:
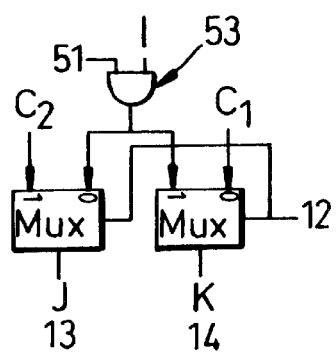
FIGS. 4 and 5 show selections circuits as shown in FIG. 3 modified to allow disabling of an input.
Figure 5:
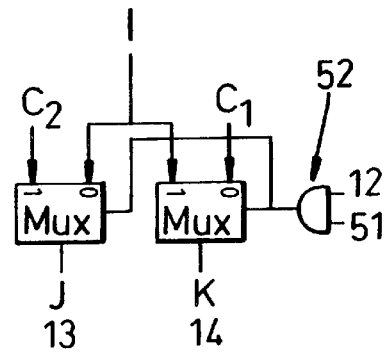

An extension to this basic mechanism is shown in FIGS. 4 and 5. The elements of the circuits of FIGS. 4 and 5 are generally the same as those of FIG. 3, but in each case an enable input 51 and an additional logic gate 52, 53 has been provided. The circuits of FIGS. 4 and 5 allow the option to disable, respectively, the external instruction input 1 and the instruction mask 12 with a single bit enable signal 51. The provision of such an extension is desirable, as it may considerably simplify operation to provide a mechanism which allows the circuit to be controlled entirely by one or the other of the main inputs.

Figure 6:
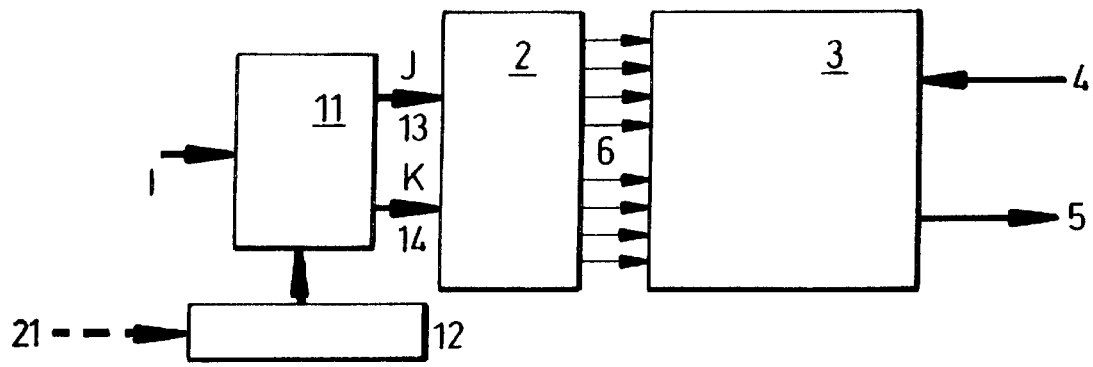
FIGS. 6 and 7 show the instruction flow of FIG. 2 with modifications to show sources for the second set of instructions.
Figure 7:
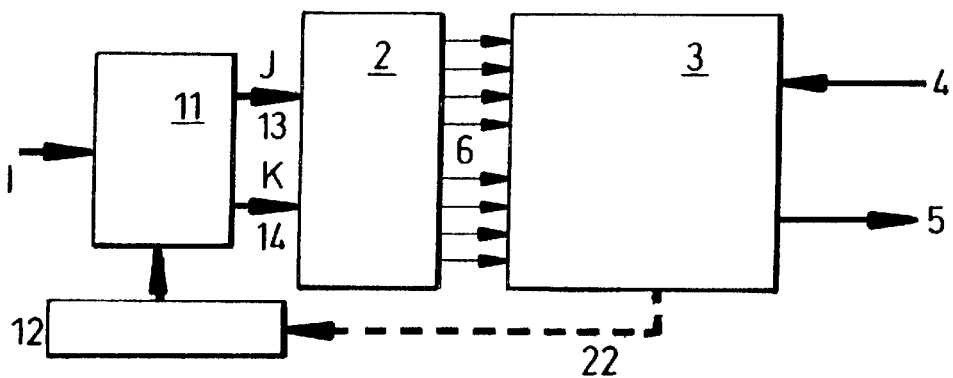

The basic mechanism shown in FIG. 2 has two main alternative versions. These differ in how the instruction mask 12 is set. This can be done as in FIG. 6, in which the mask value is set externally, though less frequently than instructions are provided on the external instruction stream 1. An example of this situation is in reconfigurable circuitry, where an instruction mask setting instruction 21 may be provided as part of the configuration, or reconfiguration information provided during operation of the device. Example 2, which exhibits this version of the FIG. 2 mechanism, is described further below. The other alternative version is that shown in FIG. 7, in which the mask setting signal 22 is provided by the device 3 under control itself. This form of control is appropriate for a more complex processor in a normal processor environment, such as a RISC CPU, an arrangement discussed further in Example 1.

There will now be described two detailed examples of the application of the preset invention to different contexts.

EXAMPLE 1

RISC Architecture

A key feature of RISC processor designs is the use of a relatively simple instruction encoding. Typically all instructions are the same size, and follow a very restrictive format as to which bits can be used for a particular purpose (eg. as register specifiers, immediate constants, operation specifiers etc.). The advantage of this approach is that the logic required to decode instructions can be simple and thus a small and fast processor can be built, but the corresponding disadvantage is that many instructions are larger than is strictly necessary: for example, it may be necessary to encode 2-operand instructions as 3-operand instructions with one input duplicated as the relevant 2-operand instruction cannot be fitted into the instruction set, and it may be necessary to allocate space for immediate constants or branch offset values according to the largest possible size required, rather than according to a typical size.

When individual instructions are larger than necessary, the whole program will be larger than necessary. As indicated above, the consequences of this are that a higher memory-to-processor bandwidth may be required, and the size of memory may affect the overall system cost.

Instruction masking according to embodiments of the invention can be used to reduce the size of instructions so that these disadvantages do not occur, while retaining the advantages of a rich instruction set. This will be discussed in the context of the DLX architecture to provide an example of the application of this approach. DLX is a simplified generic RISC processor described in "Computer Architecture, A Quantitative Approach," J. L. Hennessy & D. A. Patterson, pp 160–166 and Appendix E 1990, Morgan Kaufmann Publishers, Inc. San Mateo, Calif., USA ISBN 1-55860-069-8. The instruction formats of the DLX processor are shown below.

TABLE 1

DLX instruction formats

Bit Number

| 31 30 29 28 27 26 | 25 24 23 22 21 | 20 19 18 17 16 | 15 14 13 12 11 | 10 9 8 7 6 5 4 3 2 1 0 |
|---|---|---|---|---|
| I-type instruction (register - immediate) | | | | |
| Opcode | Rs1 | Rd | Immediate constant | |
| R-type instruction (register - register) | | | | |
| Opcode | Rs1 | Rs2 | Rd | Opcode extension |
| J-type instruction (Jump) | | | | |
| Opcode | Branch offset | | | |

Rs1 and Rs2 are source register specifiers, and Rd is the destination register specifier. an I-type instruction has one register as an operand, and the other operand is typically an immediate constant. An R-type instruction has two register operands. All three of the basic types of instruction are 32 bits long, with a 6-bit primary opcode occupying the most significant bits. Register specifiers generally occupy the same position in the instruction, and are always 5 bits long.

There will now be described the application of an embodiment of the invention to this processor. The result of applying an embodiment of the invention is in this case to reduce the number of bits per instruction to 21, but to use the masking mechanism to expand this to 42. The circuit employed is that of FIG. 5, with $C_2=0$ and $C_1=0$. The source of the control signal will be described later. A possible layout of the instruction bits within the expanded 42 bits is shown for each of the three instruction formats in Table 2 below.

TABLE 2

Compressed version of DLX formats

| | 20 19 18 17 16 | 15 14 13 12 11 10 | 9 8 7 6 5 | 4 3 2 1 0 |
|---|---|---|---|---|
| I-type instruction (register - immediate) | | | | |
| J bits | Rd | Opcode | Rs1a | Rs1b |
| K bits | Immediate constant | | | |
| R-type instruction (register - register) | | | | |
| J bits | Rd | Opcode | Rs1 | Rs2 |
| K bits | Opcode extension | | | |
| J-type instruction (Jump) | | | | |
| J bits | Branch offset | Opcode | | |
| K bits | Branch offset | | | |

Further clarification of specific features of Table 2, and of the application of the circuit of FIG. 5, is provided below.

The internal mask value 12 is taken from the R0 processor register. This register has certain "magic" properties in DLX (as does the equivalent register in many other RISC processors) making it an appropriate choice for this special control purpose, As this register has special properties, it is straightforward to add slight modifications to give it suitable properties for the present purpose. These suitable properties are as follows.

Any read from R0 in an I-type instruction returns 0. This allows the loading of constants, as operations of the form Rx=R0+const. become Rx=0+const.

Any write to R0 in an R-type instruction does not happen. The rest of the instruction happens normally, including the setting of all condition flags: only the final write back to the register file is suppressed. This enables cheap implementation of comparison operations (A>B can be implemented as R0=B−A and checking the Negative flag).

A consequence of this is that R0 can only be written with I-type instructions and can only be read with R-type instructions.

In the I-type of Rs1a and Rs1b are ORed together to create the Rs1 specifier. This allows greater flexibility in allocating bits between the instruction constant and the register specifier. For example, constants up to 5 bits long can use Rs1a as the register and $K_4 \ldots K_0$ as the constant, whereas larger constants can use Rs1b as register specifier, with $K_9 \ldots K_5$ as the constant.

The opcode extension field now contains 21 bits, rather than 11 bits. This gives greater flaxibility in allocation of bit locations in the expanded set, so the need to trade bits between register specifiers and opcode extension is not particularly restrictive.

The branch offset field has been divided into four chunks, and is reconstructed into 30-bit quantity as follows: $K_{20} \ldots H_{16}, K_9 \ldots K_0, J_{20} \ldots J_{16}, J_9 \ldots J_0$. Short branches may be represented with J bits alone. Longer branches need use K bits, but not all very long branches can be represted simply.

As instructions are 21 bits long it is possible to fit three instructions into a 64-bit group with one bit remaining. It is appropriate to use this extra bit as the Control signal 51 to determine whether the mask should be turned on or off. Groups of three instructions will thus have to share the same value of control, but this is not in practice a significant restriction—there are known methods for reordering instruction sequences to meet constraints of this nature while preserving program correctness. Fitting three instructions into 64-bits also impose a restriction on branch target alignment. The word address used to fetch an instruction can specify which of two 32b instructions in a 64b memory access is to be used, but there are no additional memory address bits to specify which of the three instructions are to be used in the proposed scheme. The easy solution is to branch only to the first of the three instructions, although other more complex schemes for manipulating address bits are also possible.

For initialisation of registers, the instruction with opcode 000000 (binary) should be an I-type instruction that will propagate one of its inputs when the other is 0 (eg Add, XOR, OR . . . ). This means that the value of R0 can be set easily using the instruction sequence shown in Table 3 below.

TABLE 3

Instruction sequence to set value of R0

| Mode | Instruction | Comments |
|---|---|---|
| IN | R0 = R0 NXOR 0 | R0 = 0 NXOR 0, = ALL 1s |
| IM | 21 bit value for R0 | All $J_i$ are 0, interpreted as R0 = R0 op (value of $K_i$) ie set R0 to the value of the $K_i$ |

The instruction mode is expressed as 2 characters: the first indicates whether the instruction is of I-, R- or J-type, whereas the second indicates the state of the control signal (M: mask is active, N: mask is not active, X: don't care). Although the first of these instructions is generally of type IN, in practice the mask could be on in many cases without adverse effect.

A variation of the above technique can be used to load a 16-bit value into any register. If R0 is 0000FFFF (hexadecimal), then the 21 bits of an instruction will be interpreted as: (5 bit register number)(16 bit constant value). With this approach, all 31 general-purpose registers can be set with 1 instruction per register plus 4 additional instructions (two pairs of two, both to initialise R0, once at the start and once at the end). The total of 35×⅔ 32 bit words,=23 ⅓ words compares favorably to the 31 words required in the uncompressed case: a saving of 25%.

Example Program

Simple Loop

The following program (written in C, as are all the program examples which follow) represents a simple loop

```
int total=0;
for (int i=0; i<max; i++) {
  A[i]=B[i]+C[i];
  total+=A[i];
}
```

The instruction sequence for this loop is shown in Table 4 below.

TABLE 4

Instruction scheme for simple loop

| Mode | Instruction | Comments | |
|---|---|---|---|
| RX | R0 = R1 − R2 | last instruction of register initialise? sets condition flags ready for branch | |
| JX | Branch to end of loop | | |
| RX | R8 = [R4] | read B[i] | Start of Loop Body |
| RX | R9 = [R5] | read C[i] | |
| RX | R10 = R8 + R9 | A[i] = B[i] +C[i] | |
| IX | [R3] = R10 | write A[i] | |
| RX | R6 = R6 + R10 | add to running total | |
| RX | R3 = R3 + R7 | update A array index | |
| RX | R4 = R4 + R7 | update B array index | |
| RX | R5 = R5 + R7 | update C array index | |
| RX | R1 = R1 + R11 | increments i, the loop count | |
| RX | R0 = R1 − R2 | test for end of loop | |
| JX | Branch back to start of loop | | |
| | NOP | for alignment purposes First instruction after loop Second instruction after loop . . . | |

The register assignments for this instruction scheme are indicated in Table 5 below.

TABLE 5

Register assignments for simple loop

| R0 | Mask register | R4 | base of B array | R8 | B[i] |
|---|---|---|---|---|---|
| R1 | i, loop index | R5 | base of C array | R9 | C[i] |
| R2 | max | R6 | total | R10 | A[i] |
| R3 | base of A array | R7 | array step | R11 | Const. 1 (i step) |

The instructions are indicated in Table 4 in groups of three instructions for fitting into a 64-bit boundary. The loop body requires 11 instructions, which fit into 8×32 bit words, compared to the 11 words for the traditional form. There is thus an overall saving in size of 27%, despite the requirement for an extra NOP instruction to guarantee correct alignment of the branch targets.

EXAMPLE 2

CHESS Architecture

CHESS is a field programmable array structure for data-intensive applications. The CHESS architecture is described in the following applications, all of which are incorporated by reference in the present application: International Patent Application No. GB 98/00248, designating the United States of America, filed on Jan. 28, 1998, and European Patent Application No. 97310220.5, filed on Dec. 17, 1997, and U.S. counterparts thereto. The overall architectural layout is not significant for the present example: for present purposes, CHESS can be considered to comprise an array of 4-bit ALUs with routing switches to enable each ALU to be connected to other ALUs through respective inputs and outputs.

Figure 8:
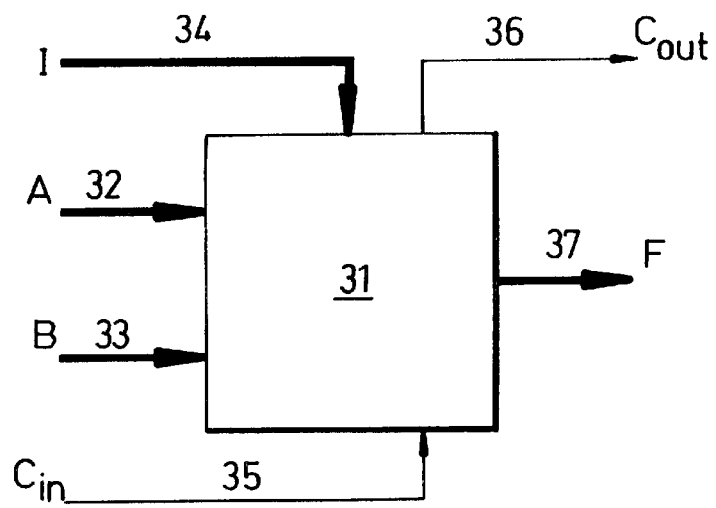
FIG. 8 shows the basic processing unit of a field programmable arithmetic array for which embodiments of the invention can be employed.

FIG. 8 shows the inputs and outputs of a CHESS 4-bit ALU. Each ALU has 3 4-bit input paths 32, 33, 34 to inputs A, B and I, and 1 4bit output path 37 which carries the output F of the ALU. These input and output paths are connected to the routing switches. There is also a 1-bit input path 35 and a 1-bit output path 36 for a carry signal, which has its own network of routing switches: these connect with input $C_{in}$ and output $C_{out}$ of the ALU respectively.

A and B are data inputs and F is a data output derived from the A and B inputs. The ALU is capable of generating arithmetic and logical functions of A and B as described below in Table 6. The effect of the carry input and output is also indicated: while these are generally used to create a carry chain to allow ALUs to be used for parallel calculation of wider words, they can also be used in comparison functions.

TABLE 6

Example ALU functions for CHESS ALU

| | | | |
|---|---|---|---|
| $F = A + B + C_{in}$ | $F = A\ AND\ B$ | $F = A\ XOR\ B$ | $F = A$ |
| $F = A - B - C_{in}$ | $F = A\ OR\ B$ | $F = A\ NXOR\ B$ | $F = B$ |
| $F = B - A - C_{in}$ | $F = A\ NAND\ B$ | | $F = NOT\ A$ |
| $F = 2A$ (Shift left) | $F = A\ NOR\ B$ | | $F = NOT\ B$ |
| $F = 2B$ (Shift left) | $F = A\ AND$ $(NOT\ B)$ | | |
| $F = -A$ (negation) | $F = (NOT\ A)$ $AND\ B$ | | |
| $F = -B$ (negation) | $F = A\ OR$ $(NOT\ B)$ $F = (NOT\ A)$ $OR\ B$ | | |

$C_{in}/C_{out}$ functions

| | |
|---|---|
| Arithmetic Carry Chain: | $C_{out}$ = carry out from $A + B + C_{in}$ |
| Comparison: | $C_{out} = (A\ !=\ B)$ |
| | $C_{out} = (A > B)$ |
| | $C_{out} = (A < B)$ |

The I input is the instruction input. Its function is to select which of the available functions the ALU actually implements. In CHESS, the I input is chosen to be of the same width as the A and B inputs and the F output: that is 4-bit. This is highly advantageous, as it allows the I input of one ALU to be driven from the F output of another (allowing dynamic instruction provision, as is discussed in European Patent Application No. 97310220.5 referenced above), and the routing network only has to carry data of one type irrespective of whether it is routing to an A, B or I input. This does impose a severe constraint on the number of instructions—a 4-bit I input implies a maximum of 16 instructions. However, Table 6 indicates more than 21 entries. A solution to this problem of providing a satisfactory instruction set with a 4-bit instruction input can be found by employing the instruction mask approach according to an embodiment of the invention.

The external I input can be expanded into 8 bits (4×J bits and 4×K bits) by using the circuit of FIG. 4. Both the mask value 12 and the control signal 51 are stored in internal registers as part of the initial configuration of the field programmable array. Here the constants are chosen such that $C_1=0$ and $C_2=1$. One result of this choice is that if control signal 51 disables the external instruction input I, J follows the stored mask value. This allows the function of the ALU to be set to a constant operation without requiring a constant value on the I input, in turn removing the requirement for the routing network to provide a constant value at I.

Configuration Example 1
K Bits Used as Input Enables

In this example, the J bits are used to determine the main instruction to the 4-bit ALU, but the K bits are used to control peripheral circuitry—specifically, to enable the A and B inputs. This allows for an effective expansion of the instruction set, as is shown in the application examples included within Configuration Example 1.

To achieve the desired arrangement, the J and K bits are allocated the following functions:

- the 4 J bits are used to select one of the 16 functions shown in Table 7 (see below);
- $K_0$ and $K_2$ are used to provide an input enable for the A input—both $K_0$ and $K_2$ are low then the input is on, otherwise it is off (equivalent to A=0000 in Table 7);
- $K_1$ and $K_3$ are used to provide an input enable for the B input—if both $K_1$ and $K_3$ are low then the input is on, otherwise it is off.

TABLE 7

Instruction encoding for Configuration Example 1

| J bits | | | | | |
|---|---|---|---|---|---|
| 3 | 2 | 1 | 0 | Instruction - | Carry |
| 1 | 1 | 1 | 1 | $A + B + C_{in}$ | |
| 0 | 1 | 1 | 1 | A OR B | |
| 1 | 0 | 1 | 1 | A NOR B | |
| 0 | 0 | 1 | 1 | 2(A OR B) | |
| 1 | 1 | 0 | 1 | $B - A - C_{in}$ | |
| 0 | 1 | 0 | 1 | (NOT A) AND B | |
| 1 | 0 | 0 | 1 | (NOT A) OR B | |
| 0 | 0 | 0 | 1 | A AND B | |
| 1 | 1 | 0 | 0 | $A - B - C_{in}$ | |
| 0 | 1 | 1 | 0 | A AND (NOT B) | |
| 1 | 0 | 1 | 0 | A OR (NOT B) | |
| 0 | 0 | 1 | 0 | A NAND B | |
| 1 | 1 | 0 | 0 | A NXOR B | $C_{out} = NOT\ C_{in}$ |
| 0 | 1 | 0 | 0 | A > B | |
| 1 | 0 | 0 | 0 | A < B | |
| 0 | 0 | 0 | 0 | A != B | |

The choices in this instruction set have been carefully made so that useful additional instruction sets result with particular choices of instruction mask value. For example, if the mask value is 0011, then J1 and J0 must both be 1, but both the A and B inputs can be turned off. The effective instruction set (the instruction set as perceived from the external instruction stream) is as shown in Table 8.

TABLE 8

Effective instruction set from Table 7 when mask = 0011

| J bits | | | | | With A input disabled | With B input disabled | With both inputs disabled |
|---|---|---|---|---|---|---|---|
| 3 | 2 | 1 | 0 | Instruction | I = XX01 | I = XX10 | I = XX11 |
| 1 | 1 | 1 | 1 | $A + B + C_{in}$ | $B + C_{in}$ | $A + C_{in}$ | $000C_{in}$ |
| 0 | 1 | 1 | 1 | A OR B | B | A | 0000 |
| 1 | 0 | 1 | 1 | A NOR B | NOT B | NOT A | 1111 (=−1) |
| 0 | 0 | 1 | 1 | 2(A OR B) | 2B | 2A | 0000 |

The values shown in the the "both inputs disabled" column are all useful constants in arithmetic operations. The constant value 1111 that results in one case represents −1 in two's complement arithmetic, and this is a frequently needed value.

Alternatively, if the mask value is 1100, then again both the A and B inputs can be turned off, but in this case J3 and J2 are both 1 and the instruction set is that shown in Table 9.

TABLE 9

Effective instruction set from Table 7 when mask = 1100

| J bits | | | | | With A input disabled | With B input disabled | With both inputs disabled |
|---|---|---|---|---|---|---|---|
| 3 | 2 | 1 | 0 | Instruction | I = 01XX | I = 10XX | I = 11XX |
| 1 | 1 | 1 | 1 | $A + B + C_{in}$ | $B + C_{in}$ | $A + C_{in}$ | $000\ C_{in}$ |
| 1 | 1 | 0 | 1 | $B - A - C_{in}$ | $B - C_{in}$ | $-A - C_{in}$ | $C_{in}C_{in}C_{in}C_{in}$ |
| 1 | 1 | 1 | 0 | $A - B - C_{in}$ | $-B - C_{in}$ | $A - C_{in}$ | $C_{in}C_{in}C_{in}C_{in}$ |
| 1 | 1 | 0 | 0 | A NXOR B | NOT B | NOT A | 1111 (=−1) |

A still further useful instruction set can be obtained when a mask value of 0101 is employed. With this mask value, there are two ways of turning A off, and the effective instruction set is as shown in Table 10.

TABLE 10

Effective instruction set from Table 7 when mask = 0101

| J bits | | | | | With A input disabled | With A input disabled | With A input disabled |
|---|---|---|---|---|---|---|---|
| 3 | 2 | 1 | 0 | Instruction | I = X0X1 | I = X1X0 | I = X1X1 |
| 1 | 1 | 1 | 1 | $A + B + C_{in}$ | $B + C_{in}$ | $B + C_{in}$ | $B + C_{in}$ |
| 1 | 1 | 0 | 1 | B − A | B | B | B |
| 0 | 1 | 1 | 1 | A OR B | B | B | B |
| 0 | 1 | 0 | 1 | (NOT A) AND B | B | B | B |

Consequently, it can be seen that for the same instruction set as perceived by the ALU 31 (in terms of what is received at the I input), a wide variety of different instruction sets can be perceived at the external instruction stream 1, because of the use of the instruction mask to change the effective instruction set by using the K bits to enable the A and B inputs. With a careful choice of basic instruction set (in terms of which of the J bit combinations are allocated to which instruction), these different effective instruction sets can be devised to be particularly effective for particular functional uses. Hence, at the configuration of the field programmable array, the mask value for a given processor element can be chosen so that the instructions available for that processor element are a set particularly suitable for the operation or operations that it needs to perform.

This is best illustrated by a series of application examples, all relating to Configuration Example 1 and the instruction sets of Tables 7 to 10. It is emphasised that the instruction choices in Table 7 are exemplary: the skilled man will be well aware from this disclosure how to devise alternative choices which yield valuable effective instruction sets.

Figure 9:
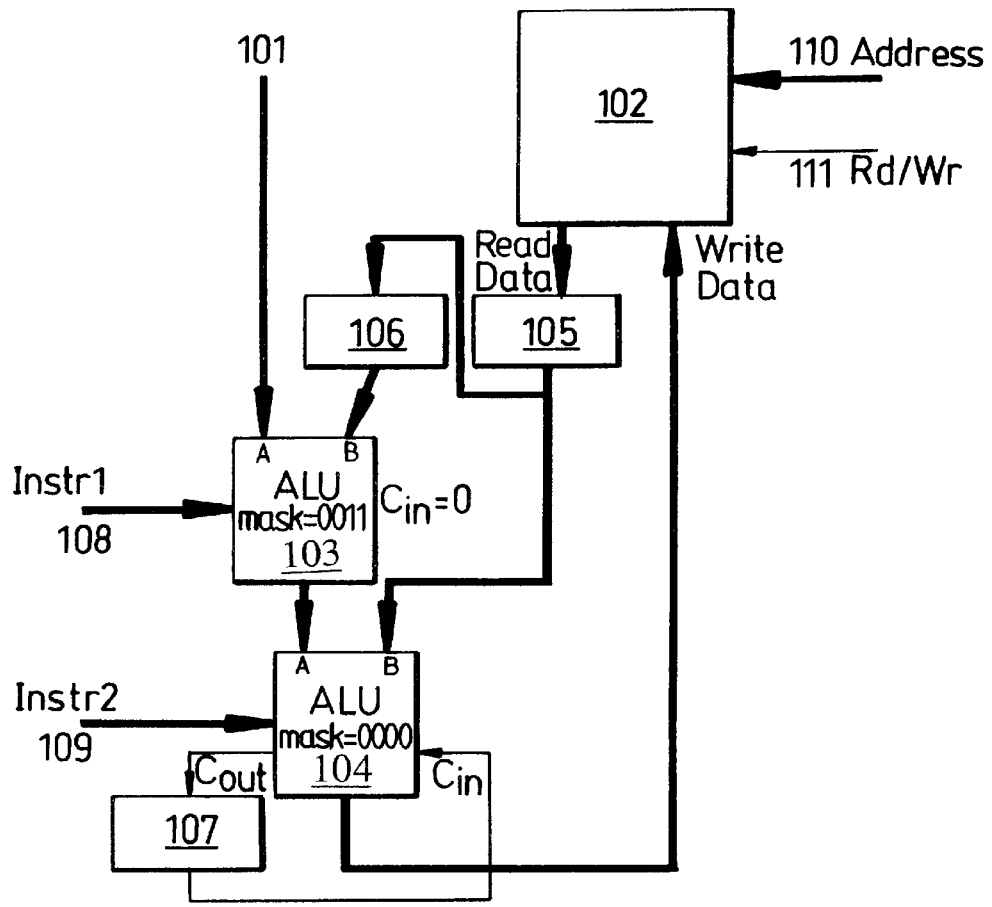
FIG. 9 shows the application of an embodiment of the invention in a field programmable arithmetic array with basic processing units as shown in FIG. 8.

A circuit for the application examples is shown in FIG. 9. The circuit contains 2 ALUs: ALU 104, which has a mask value of 0000 and hence the effective instruction set of Table 7, and ALU 103, which has a mask value of 0011 and hence the effective instruction set of Table 8. The circuit is controlled by 4 inputs: the external instruction inputs 108, 109 to ALU 103 and ALU 104 respectively; and the address input 110 and the read/write input 111 to a memory 102 used with the circuit (in the CHESS architecture, this memory can be constructed of switch memory converted to user plane memory as discussed in European Patent Application No.

97310220.5). Three registers Register 1 105, Register 2 106, and $C_{out}$ Register 107 are also provided—again, these can readily be provided from CHESS architect components. Implicit within the examples which follow is that any write to memory 102 is then written to Register 1 105.

Application Example 1
Bit Count
The following bit counting program (also in C, as are all subsequent programs)
while (Z &=(Z−1)){
    count++;
can be implemented according to the input sequence indicated in Table 11 below. Table 11 shows the instruction values, and the consequent register values.

TABLE 11

Input sequence for bit counting

| | Instr1 | Instr2 | Addr. | R/W | Reg. 1 | Reg. 2 | $C_{out}$ |
|---|---|---|---|---|---|---|---|
| Initialisation | 0 | AND | 0 | W | 0 | undefined | 0 |
| Copy external input | A | OR | 0 | W | Z | 0 | 0 |
| Repeat until $C_{out}$ is 0 after | −1 | ADD | 1 | W | Z−1 | Z | undef |
| either of the A!=B stages. At | B | AND | 0 | W | Z&(Z−1) | Z−1 | 0 |
| this point, one of the registers | 0 | A!=B | 2 | R | count | Z&(Z−1) | Q |
| contains the count, and the | 0 | ADD | 2 | W | count+Q | count | undef |
| other is 0 | B | A!=B | 0 | R | Z | count+Q | Q |

The variable Q represents the result of the comparison operation performed by the first ALU. This value may of course be 0 or 1. The count therefore will or will not be incremented (dependent on the result of the comparison.

Application Example 2
Pattern Matcher
The following code describes the operation of comparing an input value against a number of patterns and recording the number of matches.
for (i=0; i<max; i++) {
    if (Z & pattern [i])==target [i] {
        count++;
    }
}
This code can be achieved with the circuit of FIG. 9 through the input sequence shown in Table 12 below.

TABLE 12

Input sequence for pattern matching

| | Instr1 | Instr2 | Addr. | R/W | Reg. 1 | Reg. 2 | $C_{out}$ |
|---|---|---|---|---|---|---|---|
| Initialisation | 0 | AND | 0 | W | 0 | undef | 0 |
| Copy external input | A | OR | 0 | W | Z | 0 | 0 |
| Repeat this group of | 0 | OR | *pattern | R | pattern[i] | Z | 0 |
| instructions for all the | B | AND | 1 | W | Z&pattern[i] | pattern[i] | 0 |
| pattern/target pairs. | 0 | OR | *target | R | target | Z&pattern[i] | 0 |
| | B | A!=B | 2 | R | count | terget | Q |
| | 0 | ADD | 2 | W | count+Q | count | undef |
| | Don't Care | | 0 | R | Z | count+Q | undef |

As previously, the variable Q is used to represent the result of the comparison operation. The count variable is again incremented by Q after each comparison and provides the number of matches.

Configuration Example 2
K Bits Provide Immediate Constants
This configuration example is similar to Configuration Example 1, in that some of the K bits provide an input enabling function for the A and B inputs. However, in this case not all the K bits are used for that purpose, but instead other bits are used to provide immediate constants. The range of instruction types available is more restricted than in the first Configuration Example, but the mechanism for provision of an immediate constant directly simplifies the programming for certain applications considerably.

In this case, the J and K bits are allocated functions as follows:

the 4 J bits select one of 16 instructions, as set out in Table 7;

$K_0$ is used to provide an input enable for the A input—if $K_0$ is low, then the input is on, otherwise the A input is forced to the constant value $K_3K_200$;

K1 is used to provide an input enable for the B input—if K1 is low, dm he input is on, otherwise the B input is off (equivalent to being forced to the value 0000).

If the instruction mask is then set to 1111, all the J bits are forced to 1: the ALU must then always perform the instruction $A+B+C_{in}$: The choice of values to be added is determined by the K bits, as indicated in Table 13 below.

TABLE 13

Effective instructions for Configuration Example 2 with mask = 1111

| K bits | | | | | | | |
|---|---|---|---|---|---|---|---|
| 3 | 2 | 1 | 0 | $K_3K_2 = 00$ | $K_3K_2 = 01$ | $K_3K_2 = 10$ | $K_3K_2 = 11$ |
| X | X | 0 | 0 | $A + B + C_{in}$ | $A + B + C_{in}$ | $A + B + C_{in}$ | $A + B + C_{in}$ |
| X | X | 0 | 1 | $0 + B + C_{in}$ | $4 + B + C_{in}$ | $8 + B + C_{in}$ | $12 + B + C_{in}$ |
| X | X | 1 | 0 | $A + 0 + C_{in}$ | $A + 0 + C_{in}$ | $A + 0 + C_{in}$ | $A + 0 + C_{in}$ |
| X | X | 1 | 1 | $0 + 0 + C_{in}$ | $4 + 0 + C_{in}$ | $8 + 0 + C_{in}$ | $12 + 0 + C_{in}$ |

In other words, the instruction set available is:

A+B;

A;

B+any of the on stats 0, 4, 8, 12;
any of the constants 0, 4, 8, 12 (or, including the possibilities offered by $C_{in}$, any constant from 0, 1, 4, 5, 8, 9, 12, 13).

Application Example 3

Histogramming

The following code allows a histogram to be created by checking an input against the possible values of its upper two bits, and then incrementing a counter in accordance with the results of the check.

if ((Z & 12)==12) count 3++;
if ((Z & 12)==8) count 2++;
if ((Z & 12)==4) count 1++;
if ((Z & 12)==0) count 0++;

The circuit of FIG. 9, adapted so that the K bits have the function indicated above for Configuration Example 2, can be used to carry out this code. There is one further difference to the FIG. 9 case: ALU 103 is adapted to have a mask value of 1111, rather than 0011. This ALU therefore has the instruction set of Table 13. The input sequence needed to carry out this code is shown in Table 14 below.

As can be seen, after each bitwise comparison, Cout is set to internal variable Q, which has the value 0 if the first two bits of the input under test are equal to the comparison value and the value 1 if these are not: these values of Cout are then inverted in the next operation. The result is incrementation of the appropriate counter for the comparison value matching the first two bits of the input under test.

Configuration Example 3

Add/Subtract with Least Significant Bit Handeling

Figure 10:
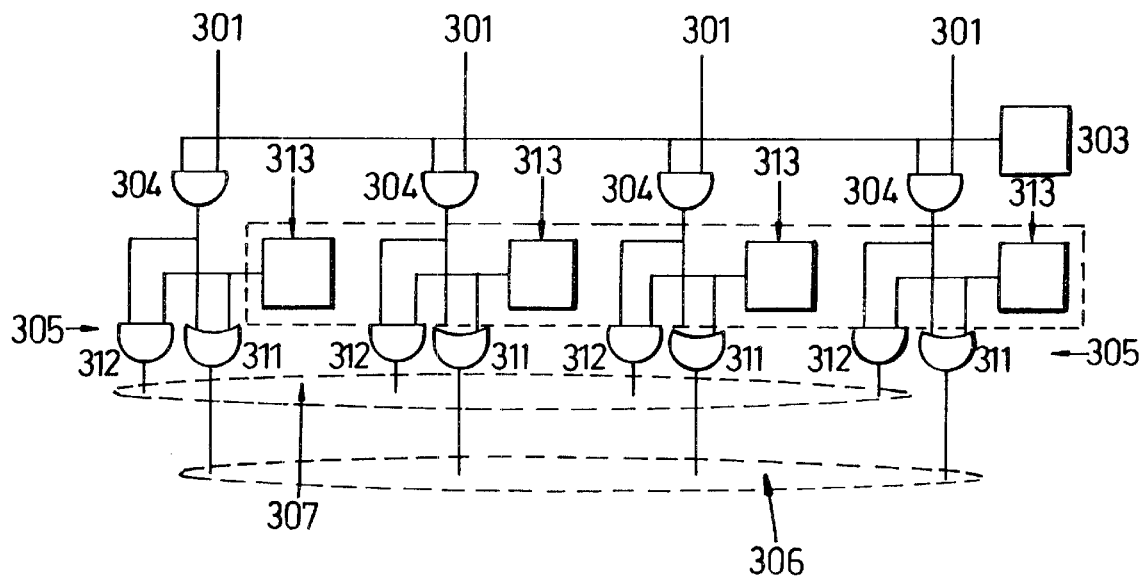
FIG. 10 shows instruction mask circuitry according to a further embodiment of the invention adapted for use in a field programmable arithmetic array with basic processing units as shown in FIG. 8.

A different representation of an instruction mask circuit according to the invention is provided in FIG. 10. This gate combination is logically similar to that indicated in FIG. 4. In this case, the bits from the external instruction stream are received on inputs 301, and a single bit of configuration RAM 303 is used to enable the external instruction input. The instruction mask value is provided by a 4-bit control register 313, and the mask circuitry itself consists of an OR gate 311 and an AND gate 312. The output 306 of the OR gate 311 is the relevant instruction bit for the ALU I input (described as $J_i$ for consistency with the usage throughout this specification) whereas the output 307 of the AND gate 312 is provided as $K_i$ bits, available for provision to other parts of the ALU as before. If input enable bit 303 is low, then all the outputs $K_i$ are low, and the instruction bits $J_i$ for the bits lice follow the 4-bit control register 313. If the input enable bit 313 is high and a control register 313 bit is low, then the external input $I_1$ is routed to the associated output for instruction bit $J_i$ and the associated $K_i$ is forced low. If the input enable 303 is high and a control register 313 bit is high, then the external input $I_i$ is routed to the associated $K_i$ and the associated output for instruction bit $J_i$ is forced high.

Figure 11:
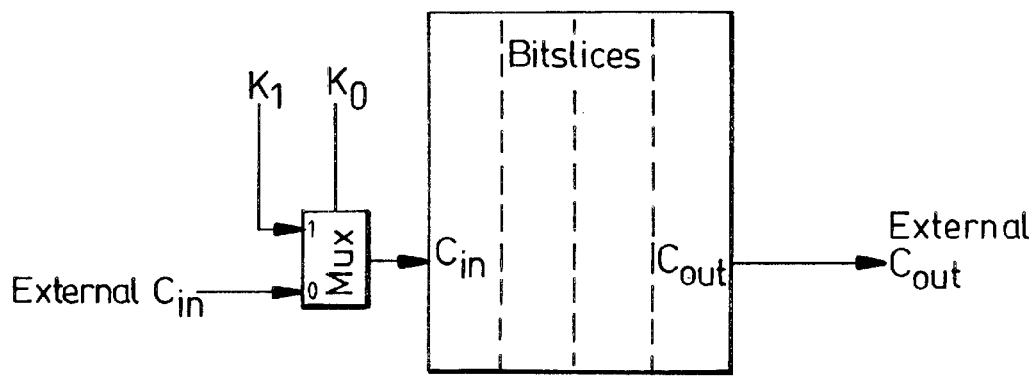
FIG. 11 shows a carry input/output path utilising diversion of bits achieved with the instruction mask circuitry of FIG. 10.

The instruction mask enables other circuitry to be controlled to be controlled synchronously with the ALU. A practical case is the swapping of an ALU between addition and subtraction operations. If this is done, it will often be necessary for the constant fed into the least significant bit of the carry chain to be set to 1 for subtraction and to 0 for addition. Provision of the mask circuitry can achieve this without the need for any additional inputs control the peripheral circuitry, as is shown in FIG. 11.

In this example, a different instruction set for the ALU from that indicated in Table 7 is considered The full details

TABLE 14

Input sequence for histogramming

| | Instr1 | Instr2 | Addr | R/W | Reg. 1 | Reg. 2 | $C_{out}$ |
|---|---|---|---|---|---|---|---|
| Initialisation | 0 | AND | 0 | W | 0 | undef | 0 |
| | 12 | OR | 0 | W | 0 | 0 | 0 |
| Copy external input | A | OR | 0 | W | Z & 12 | 0 | 0 |
| Test equal to 12 and | 12 | A!=B | 1 | R | count3 | Z & 12 | Q |
| increment count3 | B | NXOR | 1 | W | count3 | count3 | NOT Q |
| | 0 | ADD | 1 | W | count3+... | count3 | Undef |
| Test equal to 8 and | 0 | AND | 0 | R | Z & 12 | count3+... | 0 |
| increment count2 | 8 | A!=B | 2 | R | count2 | Z & 12 | Q |
| | B | NXOR | 2 | R | count2 | count2 | NOT Q |
| | 0 | ADD | 2 | W | count2+... | count2 | undef |
| Test equal to 4 and | 0 | AND | 0 | R | Z & 12 | count2+... | 0 |
| increment count1 | 4 | A!=B | 3 | R | count1 | Z & 12 | Q |
| | B | NXOR | 3 | R | count1 | count1 | NOT Q |
| | 0 | ADD | 3 | W | count1+... | count1 | undef |
| Test equal to 0 and | 0 | AND | 0 | R | Z & 12 | count1+... | 0 |
| increment count0 | 0 | A!=B | 4 | R | count0 | Z & 12 | Q |
| | B | NXOR | 4 | R | count0 | count0 | NOT Q |
| | 0 | ADD | 4 | W | count0+... | count0 | undef | of the instruction set are not significant for this example: it is sufficient to indicate that the J bits required for ADD are 0011, and the J bits required for SUB are 1111. If the instruction mask value held in the control register 313 is set to 0011, this has the effect that of the external instruction stream bits (labelled $I_i$) $I_3$ and $I_2$ connect to $J_3$ and $J_2$ respectively, but $I_1$ and $I_0$ connect to $K_1$ and $K_0$. $J_1$ and $J_0$ are both fixed to a value 1. This gives an extended set of ADD and SUB instruction codes which include ADD_LSB and SUB_LSB codes adapted to handle the least significant bits. The resulting codes for the external instruction I to achieve this set of function codes are:

| | |
|---|---|
| I input ADD instruction code | 0000 |
| I input ADD_instruction code | 0001 |
| I input SUB instruction code | 1100 |
| I input SUB_LSB instruction code | 1111 |

The ALU instruction codes J will be the same (0011) for both ADD and ADD_LSB, but for ADD $C_{in}$ is simply propagated to be $C_{in}$ for the bitslice, whereas for ADD_LSB the value of $C_{in}$ for the bitslice is always 0. The position for the SUB instructions is similar: for SUB_LSB the value of $C_{in}$ for the bitslice is always 1.

The combination of ALU instructions that can be used at the same time as the peripheral circuitry is controlled by the dynamic instruction input is thus constrained. However, this does not cause any practical difficulty, as only a limited number of cases need to be covered. For example, the case discussed above there to be two common bits between the ADD and SUB instructions: in this case bits $J_1$ and $J_0$ which both have a value of 1.

As can be seen from the examples above, use of the mask approach according to embodiments of the invention can be used to combine the advantages of a small number of bits in an instruction word, while still maintaining both a sufficiently rich instruction set for intended purposes and ease of decoding. These advantages can be achieved by using the instruction mask to adjust the effective instruction set so that it is particularly suitable for an intended purpose, or group of purposes, by an effective expansion of instruction word length, or by diverting bits to peripheral circuitry. Each of these options provides a constraint on the remaining instruction set, but it is generally found that this constraint is relatively easy to observe by good choice of the basic instruction set.

What is claimed is:

1. A circuit adapted to provide an instruction stream to a processing device, comprising:

an input adapted to receive a partial input instruction stream, the partial input instruction stream comprising a plurality of first partial input instructions, each first partial input instruction comprising a first plurality of input instruction values;

a memory adapted to contain a second partial input instruction, the second partial input instruction comprising a second plurality of input instruction values;

a selector adapted to receive an input instruction stream and to generate an output instruction stream, the input instruction stream comprising a plurality of input instructions each comprising the second partial input instruction and one of the plurality of first partial input instructions, the output instruction stream comprising a plurality of output instructions each comprising a first partial output instruction and a second partial output instruction, the first partial output instruction comprising a first plurality of output instruction values and the second partial output instruction comprising a second plurality of output instruction values;

two or more outputs adapted to provide the output instruction stream to the processing device; and a control signal path adapted to provide the second partial input instruction to the selector;

wherein the second partial input instruction comprises a partial input instruction common to each input instruction in a first input instruction set;

wherein the second partial input instruction is not provided by the partial input instruction stream;

wherein each of the plurality of first partial input instructions comprises a partial input instruction capable of varying between a first and second input instruction in the first input instruction set; and wherein the selector is adapted to generate the output instruction stream by distributing the first plurality of input instruction values and the second plurality of input instruction values amongst the two or more outputs, according to the second partial input instruction.

2. The circuit of claim 1, wherein the memory is adapted to be re-configured by the processing device.

3. The circuit of claim 1, wherein the memory is adapted to be re-configured by an external signal received less frequently than each of the plurality of first partial input instructions are received by the input.

4. The circuit of claim 1, wherein the memory is adapted to be re-configured during a reconfiguration phase and the input is adapted to receive the partial input instruction stream during a processing phase.

5. The circuit of claim 1, wherein the circuit is adapted to be re-configured to provide a second output instruction stream to the processing device by replacing the second partial input instruction contained in the memory with a third partial input instruction, the third partial input instruction comprising a partial input instruction common to each input instruction in a second input instruction set.

6. The circuit of claim 1, wherein each one of the plurality of output instructions is larger than the one of the plurality of first partial input instructions used to generate the one of the plurality of output instructions.

7. The circuit of claim 1, wherein the first plurality of output instruction values and the second plurality of output instruction values together contain more instruction values than the first plurality of partial input instruction values used to generate the first and second pluralities of output instruction values.

8. The circuit of claim 1, wherein the selector is adapted to distribute the first plurality of input instruction values and the second plurality of input instruction values amongst the two or more outputs by making a bitwise selection of output instruction values between the first plurality of input instruction values and the second plurality of input instruction values, wherein for each selection of an output instruction value one bit from either the first plurality of input instruction values or the second plurality of input instruction values is directed to one of the two or more outputs, and a corresponding bit from the other of the first plurality of input instruction values or the second plurality of input instruction values is directed to an other of the two or more outputs.

9. The circuit of claim 8, wherein the second plurality of input instruction values contains the same number of bits as the first plurality of input instruction values, and the bitwise selection is made with reference to a bit of the second plurality of input instruction values corresponding to an equally significant bit of the first plurality of input instruction values.

10. The circuit of claim 8, wherein the one of the two or more outputs provides an instruction input to the processing device and the other of the two or more outputs provides an input to peripheral circuitry of the processing device.

11. The circuit of claim 10, wherein the peripheral circuitry comprises circuitry for enabling or disabling one or more data inputs to the processing device.

12. The circuit of claim 10, wherein the peripheral circuitry comprises circuitry for providing an arithmetic constant to one or more data inputs to the processing device.

13. The circuit of claim 1, wherein the circuit is adapted for use with a processing device which has a datapath width which is the same for both instructions and data, and for which register use is specified independently from instruction function.

14. The circuit of claim 1, further comprising a disable adapted to disable the provision of the first plurality of instruction values to the selector, so that the processing device is controlled according to the second plurality of instruction values and a plurality of default instruction values.

15. The circuit of claim 1, further comprising a disabler adapted to disable the provision of the second plurality of instruction values to the selector, so that the processing device is controlled according to the first plurality of instruction values and a plurality of default instruction values.

16. The circuit of claim 1, wherein the selector comprises a plurality of multiplexers.

17. The circuit of claim 1, wherein the selector comprises a plurality of AND-gate/OR-gate pairs, each AND-gate/OR-gate pair receiving a bit from the first plurality of input instruction values and a corresponding bit from the second plurality of input instruction values.

18. The circuit of claim 1, wherein the first partial output instruction is provided to one of the two or more outputs and the second partial output instruction is provided to an other of the two or more outputs.

19. The circuit of claim 1, wherein the instruction values comprise bits.

20. A field programmable array, comprising:
   a plurality of processing devices;
   a configurable wiring network; and
   one or more circuits for providing an instruction stream to one or more of the plurality of processing devices, the circuits each comprising:
   an input adapted to receive a partial input instruction stream, the partial input instruction stream comprising a plurality of first partial input instructions, each first partial input instruction comprising a first plurality of input instruction values;
   a memory adapted to contain a second partial input instruction, the second partial input instruction comprising a second plurality of input instruction values;
   a selector adapted to receive an input instruction stream and to generate an output instruction stream, the input instruction stream comprising a plurality of input instructions each comprising the second partial input instruction and one of the plurality of first partial input instructions, the output instruction stream comprising a plurality of output instructions each comprising a first partial output instruction and a second partial output instruction, the first partial output instruction comprising a first plurality of output instruction values and the second partial output instruction comprising a second plurality of output instruction values;
   two or more outputs adapted to provide the output instruction stream to the processing device; and
   a control signal path adapted to provide the second partial input instruction to the selector;
   wherein the second partial input instruction comprises a partial input instruction common to each input instruction in a first input instruction set;
   wherein the second partial input instruction is not provided by the partial input instruction stream;
   wherein each of the plurality of first partial input instructions comprises a partial input instruction capable of varying between a first and second input instruction in the first input instruction set; and
   wherein the selector is adapted to generate the output instruction stream by distributing the first plurality of input instruction values and the second plurality of input instruction values amongst the two or more outputs, according to the second partial input instruction.

21. The field programmable array of claim 20, wherein the processing devices comprise ALUs.

22. The field programmable array of claim 21, wherein the ALUs comprise 4-bit ALUs, and wherein the ALUs comprise 4-bit width instruction and data inputs.

23. The field programmable array of claim 20, wherein the instruction values comprise bits.

* * * * *

UNITED STATES PATENT AND TRADEMARK OFFICE
CERTIFICATE OF CORRECTION

PATENT NO.    : 6,523,107 B1
DATED         : February 18, 2003
INVENTOR(S)   : Anthony Stansfield et al.

It is certified that error appears in the above-identified patent and that said Letters Patent is hereby corrected as shown below:

Column 19,
Line 20, please change "disable" to -- disabler --.

Signed and Sealed this

Eleventh Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,523,107 B1
DATED : December 11, 1998
INVENTOR(S) : Anthony Stansfield et al.

It is certified that error appears in the above-identified patent and that said Letters Patent is hereby corrected as shown below:

<u>Title page,</u>
Item [56], References Cited, OTHER PUBLICATIONS, please add the following:

-- Nagendra, C., et al., "Digit Pipelined Arithmetic on Fine-Grain Array Processors", *Journal of VLSI Signal Processing*, vol. 9, no. 3, 1 April 1995, pp. 193-209.

Maxfield, C., "Logic that Mutates While-U-Wait", *EDN (European Edition), Cahners Publishing, USA,*. vol. 41, No. 23, November 7, 1996, pp. 137-142. --

Signed and Sealed this

Third Day of August, 2004

JON W. DUDAS
*Acting Director of the United States Patent and Trademark Office*